United States Patent [19]
Kaku et al.

[11] Patent Number: 5,719,907
[45] Date of Patent: Feb. 17, 1998

[54] PHASE JITTER EXTRACTION CIRCUIT AND PHASE JITTER CANCELLATION CIRCUIT

[75] Inventors: Takashi Kaku; Hideo Miyazawa, both of Kawasaki, Japan

[73] Assignee: Fujitsu Limited, Kanagawa, Japan

[21] Appl. No.: 534,161

[22] Filed: Sep. 26, 1995

[30] Foreign Application Priority Data

Dec. 20, 1994 [JP] Japan .................... 6-317331

[51] Int. Cl.$^6$ ................. H04L 25/38; H04L 5/16
[52] U.S. Cl. ........................ 375/371; 375/222
[58] Field of Search ........................ 375/371, 320, 375/222, 373, 346, 285; 327/141; 379/93, 98

[56] References Cited

U.S. PATENT DOCUMENTS

| | | | |
|---|---|---|---|
| 4,689,804 | 8/1987 | Srinivasagopalan et al. | 375/346 |
| 4,953,186 | 8/1990 | Levy et al. | 375/373 |
| 5,128,968 | 7/1992 | Yoshida | 375/371 |
| 5,175,746 | 12/1992 | Inoue et al. | 375/373 |
| 5,280,473 | 1/1994 | Rushing et al. | 379/410 |
| 5,388,122 | 2/1995 | Kawada et al. | 375/222 |
| 5,434,884 | 7/1995 | Rushing et al. | 375/371 |

FOREIGN PATENT DOCUMENTS 433 458 A1  12/1990  European Pat. Off. .

OTHER PUBLICATIONS

Abstract of Japanese Patent Publ. No. 1-93951, dated Apr. 12, 1989.

*Primary Examiner*—Tesfaldet Bocure
*Attorney, Agent, or Firm*—Nikaido Marmelstein Murray & Oram LLP

[57] ABSTRACT

The invention provides a phase jitter extraction circuit and a phase jitter cancellation circuit for use with a reception section of a communication apparatus such as a modem used to transmit data using a telephone line or a private line, which are improved in that noise of a signal is prevented from increasing to suppress phase jitters with a high degree of accuracy and high noise components can be suppressed irrespective of the power of the input signal. The phase jitter extraction circuit includes a phase jitter detection section for detecting phase jitters from input/output information of a signal discriminator, a phase jitter forecasting section for forecasting phase jitters which will be produced later from the phase jitters detected by the phase jitter detection section, a selector for selectively outputting the phase jitters detected by the phase jitter detection section or the forecast phase jitters obtained by the phase jitter forecasting section, and a selector control section for discriminating a region of signal points received by the communication apparatus by way of a transmission line and controlling the selector in accordance with a result of the discrimination.

8 Claims, 15 Drawing Sheets

PHASE JITTER EXTRACTION CIRCUIT AND PHASE JITTER CANCELLATION CIRCUIT

BACKGROUND OF THE INVENTION

1. Field of the Invention

This invention relates to a phase jitter extraction circuit and a phase jitter cancellation circuit for use with a reception section of a communication apparatus such as a modem which is used to communicate data using a telephone line or a private line.

2. Description of the Related Art

Various modems (modulator-demodulators) for use for transmission of data which can transmit data at various transmission rates have been provided.

Generally, modems for the transmission rate of 9,600 bit/sec (9.6 kbps) according to the Recommendation V. 29 adopt and modems for the transmission rate of 14.4 kbps are practically used widely. However, in order to meet the request for a higher rate in communications in recent years, efforts are directed to development and investigation of very high speed modems for the transmission rate of 28.8 kbps.

By the way, upon transmission of a transmission signal from a modem, signal points having a required eye pattern (data point arrangement pattern on a phase plane) are generated to modulate and transmit the data, and on the reception side, the received signal is demodulated to reproduce the data.

In a modem having such a very high transmission rate of 28.8 kbps as described above, since the number of signal points on an eye pattern is much more than that of ordinary modems whose transmission rate is 9.6 kbps or 14.4 kbps, phase jitters by which the phase of signal points is fluctuated make one of important factors which cause deterioration of a line or a communication error.

Accordingly, in ordinary modems, a phase jitter cancellation circuit for suppressing phase jitters is provided in a reception section to prevent such deterioration of a line or a communication error as described above.

FIG. 15 shows in block diagram an ordinary phase jitter cancellation circuit. Referring to FIG. 15, the phase jitter cancellation circuit is generally denoted at 91 and constructs a carrier phase control circuit (carrier phase correction section) interposed between an automatic equalizer (automatic equalization section) and a signal discriminator (signal discrimination section) of a reception section of a communication apparatus such as a modem as hereinafter described. The phase jitter cancellation circuit 91 shown includes a normalization section 92, a non-linear limiter section 93, a forecasting filter 94, an error normalization section 95 and a conversion section 96.

The normalization section 92 receives, as inputs thereto, for example, an equalization output signal from the automatic equalization section and a normalization signal from the signal discrimination section and outputs an equalization remaining signal as an imaginary component. The non-linear limiter section 93 suppresses noise components of a signal higher than a preset threshold value by means of a limiter and outputs a resulted signal. The normalization section 92 and the non-linear limiter section 93 cooperatively function as a phase jitter extraction section (phase jitter extraction circuit) for extracting phase jitters.

The error normalization section 95 receives, as inputs thereto, an error signal and a normalization signal from a result of discrimination from the signal discrimination section not shown and outputs an error signal as an imaginary component.

Further, the forecasting filter section 94 calculates a phase jitter value from the output of the non-linear limiter section 93 and the output of the error normalization section 95 and outputs a phase jitter correction value θ by which a value corresponding to the thus calculated phase jitter value is to be rotated reversely.

The conversion section 96 receives, as an input thereto, the phase jitter correction value θ from the forecasting filter 94 and converts it into sinθ and cosθ. The conversion section 96 thus outputs the values of sinθ and cosθ as a phase jitter correction signal (signal to cancel the phase jitters).

A multiplier 97 multiplies the equalization output signal and the phase jitter correction signal from the conversion section 96 to cancel the phase jitters of the equalization output signal.

In the ordinary phase jitter cancellation circuit shown in FIG. 15 and having the construction described above, the normalization signal by which the equalization output signal is to be multiplied by the normalization section 92 is calculated so that the result of the multiplication may exhibit a single point and high noise components are suppressed by the non-linear limiter section 93 to extract phase jitters.

However, in the ordinary phase jitter cancellation circuit described above, since the normalization signal is calculated so that the result of multiplication by the normalization section 92 may exhibit a single point, for example, if the equalization output signal is a signal proximate to the origin, the normalization signal outputted then has a large amplitude, but if the equalization output signal is remote from the origin, the normalization signal output then has a small amplitude.

In other words, the ordinary phase jitter cancellation circuit has a subject to be solved in that, when the equalization output signal is proximate to the origin, the control acts in a direction to increase the noise of the signal.

Further, since the threshold level of the non-linear limiter section 93 described above is fixed, if a signal wave including noise has, for example, such a waveform as shown in (A) of FIG. 16, noise components can be suppressed because they are higher than the threshold level. However, if the signal wave has such a waveform of a low input level as shown in (A') of FIG. 17, although noise components have a high level, since the level thereof is lower than the threshold level, the noise cannot be suppressed, which is another subject to be solved of the ordinary phase jitter cancellation circuit described above.

SUMMARY OF THE INVENTION

It is an object of the present invention to provide a phase jitter extraction circuit and a phase jitter cancellation circuit wherein noise of a signal is prevented from increasing to suppress phase jitters with a high degree of accuracy and a threshold level for suppressing noise in a limiter section is varied in response to the power of an input signal to suppress high noise components irrespective of the power of the input signal.

In order to attain the object described above, according to an aspect of the present invention, there is provided a phase jitter extraction circuit which is provided on a reception side of a communication apparatus and interposed between an automatic equalizer and a signal discriminator for extracting phase jitters produced in a transmission line, comprising a phase jitter detection section for detecting phase jitters from input/output information of the signal discriminator, a phase jitter forecasting section for forecasting phase jitters which will be produced later from the phase jitters detected by the phase jitter detection section, a selector for selectively outputting the phase jitters detected by the phase jitter detection section or the forecast phase jitters obtained by the phase jitter forecasting section, and a selector control section for discriminating a region of signal points received by the communication apparatus by way of the transmission line and controlling the selector in accordance with a result of the discrimination.

With the phase jitter extraction circuit, since the selector control section discriminates a region of signal points received by the communication apparatus by way of the transmission line and controls the selector in accordance with a result of the discrimination, it is advantageous in that expansion of noise by the phase jitter detection section caused by multiplication of a signal from which a frequency offset of an equalization output signal has been cancelled and a normalization signal can be prevented and stabilized phase jitter cancellation can be achieved, which contributes to improvement in performance of a communication apparatus.

According to another aspect of the present invention, there is provided a phase jitter extraction circuit which is provided on a reception side of a communication apparatus and interposed between an automatic equalizer and a signal discriminator for extracting phase jitters produced in a transmission line, comprising a phase jitter detection section for detecting phase jitters from input/output information of the signal discriminator, a limiter section for limiting an output of the phase jitter detection section so as to fall within a range defined by a pair of threshold values, a power detection section for detecting a power of the phase jitters detected by the phase jitter detection section, and a threshold value variation section for varying the threshold values of the limiter section based on the power of the phase jitters detected by the power detection section.

With the phase jitter extraction circuit, since the threshold value variation section can vary the threshold values of the limiter section based on the power of the phase jitters detected by the power detection section, it is advantageous in that noise components can be suppressed effectively even when a waveform of a low input level includes high noise components.

According to a further aspect of the present invention, there is provided a phase jitter cancellation circuit which is provided on a reception side of a communication apparatus and interposed between an automatic equalizer and a signal discriminator for extracting phase jitters produced in a transmission line and outputting a signal to cancel the phase jitters, comprising a phase jitter extraction section for extracting phase jitters from input/output information of the signal discriminator, a forecasting filter for calculating phase information to cancel the phase jitters extracted by the phase jitter extraction section, and a conversion section for converting an output of the forecasting filter into a vector, the phase jitter extraction section including a phase jitter detection section for detecting phase jitters normalized to a predetermined position on a vector plane from the input/output information of the signal discriminator, a phase jitter forecasting section for forecasting phase jitters which will be produced later from the normalized phase jitters detected by the phase jitter detection section, a selector for selectively outputting the phase jitters detected by the phase jitter detection section or the forecast phase jitters obtained by the phase jitter forecasting section, a selector control section for discriminating a region of signal points received by the communication apparatus by way of the transmission line and controlling the selector based on a result of the discrimination, a limiter section for limiting an output of the selector so as to fall within a rage defined by a pair of threshold values and outputting a resulted signal to the forecasting filter, a power detection section for detecting a power of the normalized phase jitters detected by the phase jitter detection section, and a threshold value variation section for varying the threshold values of the limiter section based on the power of the normalized phase jitters detected by the power detection section.

With the phase jitter cancellation circuit, since the selector control section discriminates a region of signal points received by the communication apparatus by way of the transmission line and controls the selector in accordance with a result of the discrimination, it is advantageous in that expansion of noise by the phase jitter detection section caused by multiplication of a signal from which a frequency offset of an equalization output signal has been cancelled and a normalization signal can be prevented and stabilized phase jitter cancellation can be achieved, which contributes to improvement in performance of a communication apparatus.

Further, with the phase jitter cancellation circuit, since noise of the signal from the phase jitter detection section is suppressed, it is advantageous also in that stabilized phase jitter cancellation can be achieved, which contributes to improvement in performance of a communication apparatus.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspects of the Invention

Aspects of the present invention will first be described with reference to the drawings.

Figure 1:
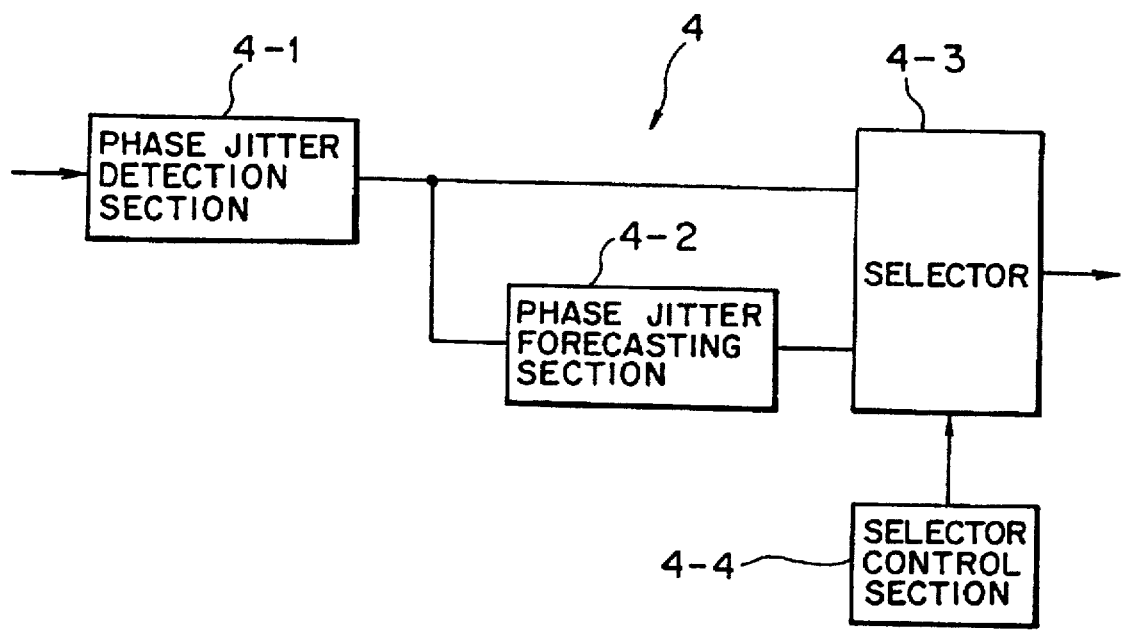
FIGS. 1 to 3 are block diagrams illustrating different aspects of the present invention.

Referring first to FIG. 1, there is shown in block diagram a phase jitter extraction circuit according to an aspect of the present invention. The phase jitter extraction circuit is generally denoted at 4 and is provided on a reception side of a communication apparatus and interposed between an automatic equalizer 2 and a signal discriminator 3 (refer to FIG. 3) in order to extract phase jitters produced in a transmission line. The phase jitter extraction circuit 4 includes a phase jitter detection section 4-1, a phase jitter forecasting section 4-2, a selector 4-3, and a selector control section 4-4.

The phase jitter detection section 4-1 detects phase jitters from input/output information of the signal discriminator 3, ansection 4-2 fitter forecasting section 4-2 forecasts phase jitters which will be produced later from the phase jitters detected by the phase jitter detection section 4-1.

The selector 4-3 selectively outputs the phase jitters detected by the phase jitter detection section 4-1 or the forecast phase jitters obtained by the phase jitter forecasting section 4-2, and the selector control section 4-4 discriminates a region of signal points received by the communication apparatus by way of the transmission line and controls the selector 4-3 in accordance with a result of the discrimination.

The phase jitter detection section 4-1 may be constructed so as to detect phase jitters normalized to a predetermined position of a vector plane from the input/output information of the signal discriminator 3.

The phase jitter forecasting section 4-2 may be constructed so as to add and average the phase jitters detected by the phase jitter detection section 4-1 to forecast phase jitters which will be produced later.

The selector control section 4-4 may include a region discrimination section for discriminating a region of signal points received by the communication apparatus by way of the transmission line based on the output of the signal discriminator 3, or another region discrimination section for discriminating a region of signal points received by the communication apparatus by way of the transmission line based on a signal obtained by normalization of the output of the signal discriminator 3, or else a further region discrimination section for discriminating a region of signal points received by the communication apparatus by way of the transmission line based on a signal from which phase jitters have been cancelled.

In the phase jitter extraction circuit described above, as seen from FIG. 1, phase jitters are detected from input/output information of the signal discriminator 3 by the phase jitter detection section 4-1, and phase jitters which will be produced later are forecast by the phase jitter forecasting section 4-2 from the phase jitters detected by the phase jitter detection section 4-1.

Meanwhile, a region of signal points received by the communication apparatus by way of the transmission line is discriminated by the selector control section 4-4, and the selector 4-3 is controlled in accordance with a result of the discrimination by the selector control section 4-4. Consequently, the selector 4-3 selectively outputs the phase jitters detected by the phase jitter detection section 4-1 or the forecast phase jitters obtained by the phase jitter forecasting section 4-2 to allow extraction of phase jitters produced in the transmission line.

The phase jitter detection section 4-1 can detect phase jitters normalized to a predetermined position of a vector plane from the input/output information of the signal discriminator 3.

Further, the phase jitter forecasting section 4-2 can add and average the phase jitters detected by the phase jitter detection section 4-1 to forecast phase jitters which will be produced later.

The region discrimination section of the selector control section 4-4 discriminates a region of signal points received by the communication apparatus by way of the transmission line based on the output of the signal discriminator 3, or on a signal obtained by normalization of the output of the signal discriminator 3, or else on a signal from which phase jitters have been cancelled.

Accordingly, with the phase jitter extraction circuit of the present invention described above, since the selector control section 4-4 discriminates a region of signal points received by the communication apparatus by way of the transmission line and controls the selector 4-3 in accordance with a result of the discrimination, it is advantageous in that expansion of noise by the phase jitter detection section 4-1 caused by multiplication of a signal from which a frequency offset of an equalization output signal has been cancelled and a normalization signal can be prevented and stabilized phase jitter cancellation can be achieved, which contributes to improvement in performance of a communication apparatus.

Further, with the phase jitter extraction circuit, since the phase jitter detection section 4-1 detects phase jitters normalized to a predetermined position on a vector plane from input/output information of the signal discriminator, it is advantageous also in that calculation processing and so forth at a stage following the phase jitter extraction circuit is facilitated.

Furthermore, with the phase jitter extraction circuit, since the phase jitter forecasting section 4-2 can add and average phase jitters detected by the phase jitter detection section 4-1 to forecast phase jitters which will be produced later, it is advantageous also in that phase jitters can be forecast with a high degree of accuracy.

Figure 2:
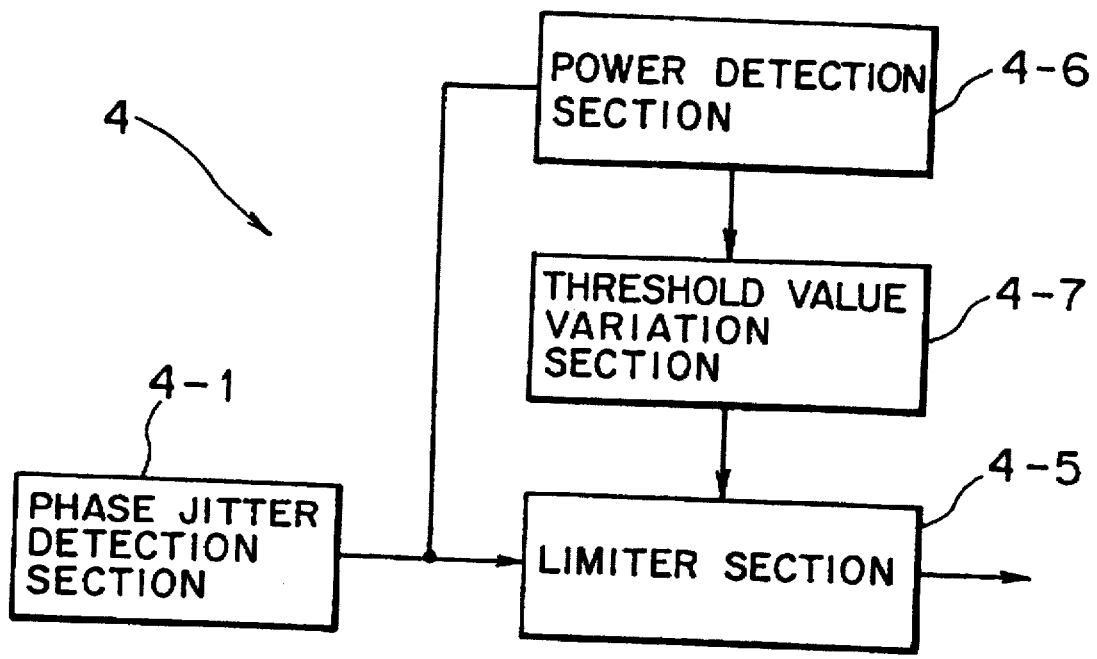

Referring now to FIG. 2, there is shown in block diagram a phase jitter extraction circuit according to another aspect of the present invention. Also the present phase jitter extraction circuit is generally denoted at 4 and is provided on a reception side of a communication apparatus and interposed between an automatic equalizer 2 and a signal discriminator 3 (refer to FIG. 3) in order to extract phase jitters produced in a transmission line. The phase jitter extraction circuit 4 includes a phase jitter detection section 4-1, a limiter section 4-5, a power detection section 4-6, and a threshold value variation section 4-7.

The phase jitter detection section 4-1 detects phase jitters from input/output information of the signal discriminator 2, and the limiter section 4-5 limits the output of the phase jitter detection section 4-1 so as to fall within a range defined by a pair of threshold values.

The power detection section 4-6 detects a power of the phase jitters detected by the phase jitter detection section 4-1, and the threshold value variation section 4-7 varies the threshold values of the limiter section 4-5 based on the power of the phase jitters detected by the power detection section 4-6.

In the phase jitter extraction circuit described above, as seen from FIG. 2, phase jitters are detected from input/output information of the signal discriminator 3 by the phase jitter detection section 4-1, and the power of the phase jitters detected by the phase jitter detection section 4-1 is detected by the power detection section 4-6.

Then, the limiter section 4-5 performs limitation processing of the output of the phase jitter detection section 4-1 so as to fall within the range defined by the pair of threshold values, and consequently can extract phase jitters produced in the transmission line. The threshold values are varied by the threshold value variation section 4-7 based on the power of the phase jitters detected by the power detection section 4-6.

Accordingly, with the phase jitter extraction circuit of the present invention described above, since the threshold value variation section 4-7 can vary the threshold values of the limiter section 4-5 based on the power of the phase jitters detected by the power detection section 4-6, it is advantageous in that noise components can be suppressed effectively even when a waveform of a low input level includes high noise components.

Figure 3:
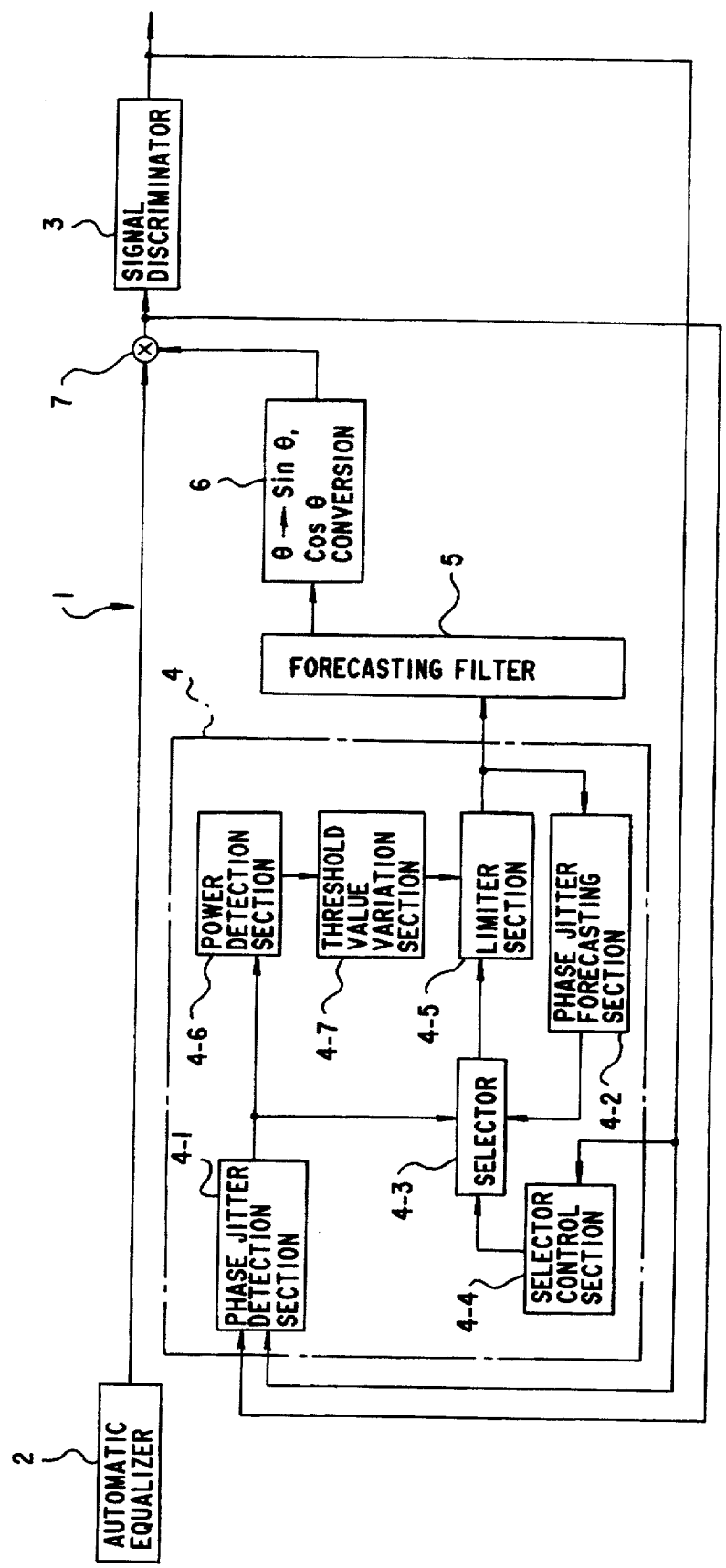

Referring now to FIG. 3, there is shown in block diagram a phase jitter cancellation circuit according to a further aspect of the present invention. The phase jitter cancellation circuit is generally denoted at 1 and is provided on a reception side of a communication apparatus and interposed between an automatic equalizer 2 and a signal discriminator 3 in order to extract and cancel phase jitters produced in a transmission line. The phase jitter cancellation circuit 1 includes a phase jitter extraction section 4, a forecasting filter 5, and a conversion section 6.

The phase jitter extraction section 4 extracts phase jitters from input/output information of the signal discriminator 3, and the forecasting filter 5 calculates phase information to cancel the phase jitters extracted by the phase jitter extraction section 4. The conversion section 6 converts the output of the forecasting filter 5 into a vector.

The phase jitter extraction section 4 includes a phase jitter detection section 4-1, a phase jitter forecasting section 4-2, a selector 4-3, a selector control section 4-4, a limiter section 4-5, a power detection section 4-6, and a threshold value variation section 4-7.

The phase jitter detection section 4-1 detects phase jitters normalized to a predetermined position on a vector plane from the input/output information of the signal discriminator 3, and the phase jitter forecasting section 4-2 forecasts phase jitters which will be produced later from the normalized phase jitters detected by the phase jitter detection section 4-1.

The selector 4-3 selectively outputs the phase jitters detected by the phase jitter detection section 4-1 or the forecast phase jitters obtained by the phase jitter forecasting section 4-2. The selector control section 4-4 discriminates a region of signal points received by the communication apparatus by way of the transmission line and controls the selector 4-3 based on a result of the discrimination.

The limiter section 4-5 performs limitation processing of the output of the selector 4-3 so as to fall within the range defined by the pair of threshold values, and outputs a resulted signal to the forecasting filter 5.

The power detection section 4-6 detects the power of the normalized phase jitters detected by the phase litter detection section 4-1, and the threshold value variation section 4-7 varies the threshold values of the limiter section 4-5 based on the power of the normalized phase jitters detected by the power detection section 4-6.

It is to be noted that, in FIG. 3, a multiplier 7 can cancel phase jitters by multiplying phase information for cancellation of phase jitters after conversion into a vector by the conversion section 6 described above and a signal from the automatic equalizer 2.

In the phase jitter cancellation circuit of the present invention described above, as seen from FIG. 3, phase jitters normalized to a predetermined position on a vector plane are detected from input/output information of the signal discriminator 3 by the phase jitter detection section 4-1, and phase jitters which will be produced later are forecast by the phase jitter forecasting section 4-2 from the normalized phase jitters detected by the phase jitter detection section 4-1.

Meanwhile, a region of signal points received by the communication apparatus by way of the transmission line is discriminated by the selector control section 4-4, and the selector 4-3 is controlled in accordance with a result of the discrimination by the selector control section 4-4. Consequently, the selector 4-3 selectively outputs the phase jitters detected by the phase jitter detection section 4-1 or the forecast phase jitters obtained by the phase jitter forecasting section 4-2.

Further, the limiter section 4-5 performs limitation processing of the output of the selector 4-3 so as to fall within the range defined by the pair of threshold values, and outputs a resulted signal to the forecasting filter 5. The threshold values are varied by the threshold value variation section 4-7 based on the power of the normalized phase jitters from the phase jitter detection section 4-1 detected by the power detection section 4-6.

Thus, the phase jitter extraction section 4 extracts phase jitters from input/output information of the signal discriminator 3, and the forecasting filter 5 calculates phase information for cancellation of the phase jitters extracted by the phase jitter extraction section 4. Then, the conversion section 6 converts the output of the forecasting filter 5 into a vector and outputs a signal to cancel the phase jitters.

It is to be noted that, in FIG. 3, the multiplier 7 multiplies the phase information for cancellation of phase jitters after conversion into a vector by the conversion section 6 and the signal from the automatic equalizer 2 to cancel the phase jitters.

Accordingly, with the phase jitter cancellation circuit of the present invention described above, since the selector control section 4-4 discriminates a region of signal points received by the communication apparatus by way of the transmission line and controls the selector 4-3 in accordance with a result of the discrimination, it is advantageous in that expansion of noise by the phase jitter detection section 4-1 caused by multiplication of a signal from which a frequency offset of an equalization output signal has been cancelled and a normalization signal can be prevented and stabilized phase jitter cancellation can be achieved, which contributes to improvement in performance of a communication apparatus.

Further, with the phase jitter cancellation circuit of the present invention described above, since noise of the signal from the phase jitter detection section 4-1 is suppressed, it is advantageous also in that stabilized phase jitter cancellation can be achieved, which contributes to improvement in performance of a communication apparatus.

b. Description of the Preferred Embodiment

Figure 4:
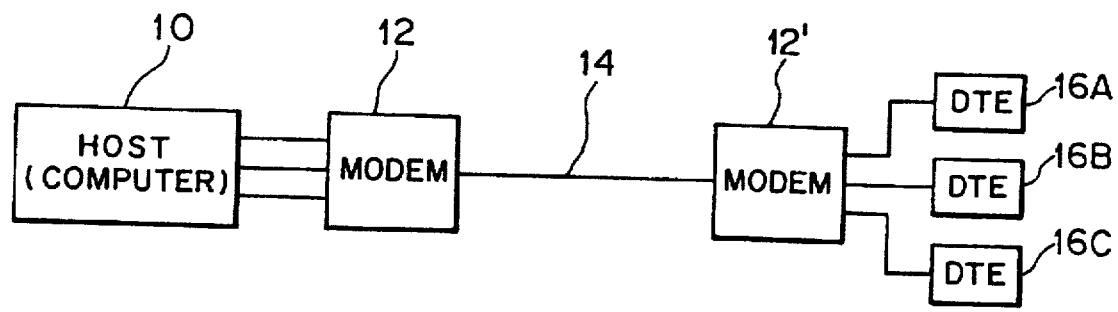
FIG. 4 is a block diagram of an on-line system to which the present invention is applied.

Referring to FIG. 4, there is shown in block diagram an on-line system to which the present invention is applied. The on-line system shown includes a host computer 10, a modem 12 connected to the host computer 10 by way of a communication control apparatus (CCP) (not shown), and a modem 12' located at another location and connected to the modem 12 by way of an analog line (private line) 14. Terminals 16A to 16C serving as working stations are connected to the modem 12'.

The modems 12 and 12' are each constructed as a very high speed modem having a transmission rate of, for example, 28.8 kbps. Each of the modems 12 and 12' time division processes and modulates, for example, a main channel for three main data and a secondary channel for a secondary data for supervision of the network and transmits a resulted signal in accordance with a non-Nyquist transmission system whereas it demodulates a reception signal to regenerate such individual data (main data and secondary data). Further, each of the modems 12 and 12' transmits, prior to transmission of data, training data having a training pattern which will be hereinafter described, so that initialization processing of a reception section can be performed using the training data.

Figure 6:
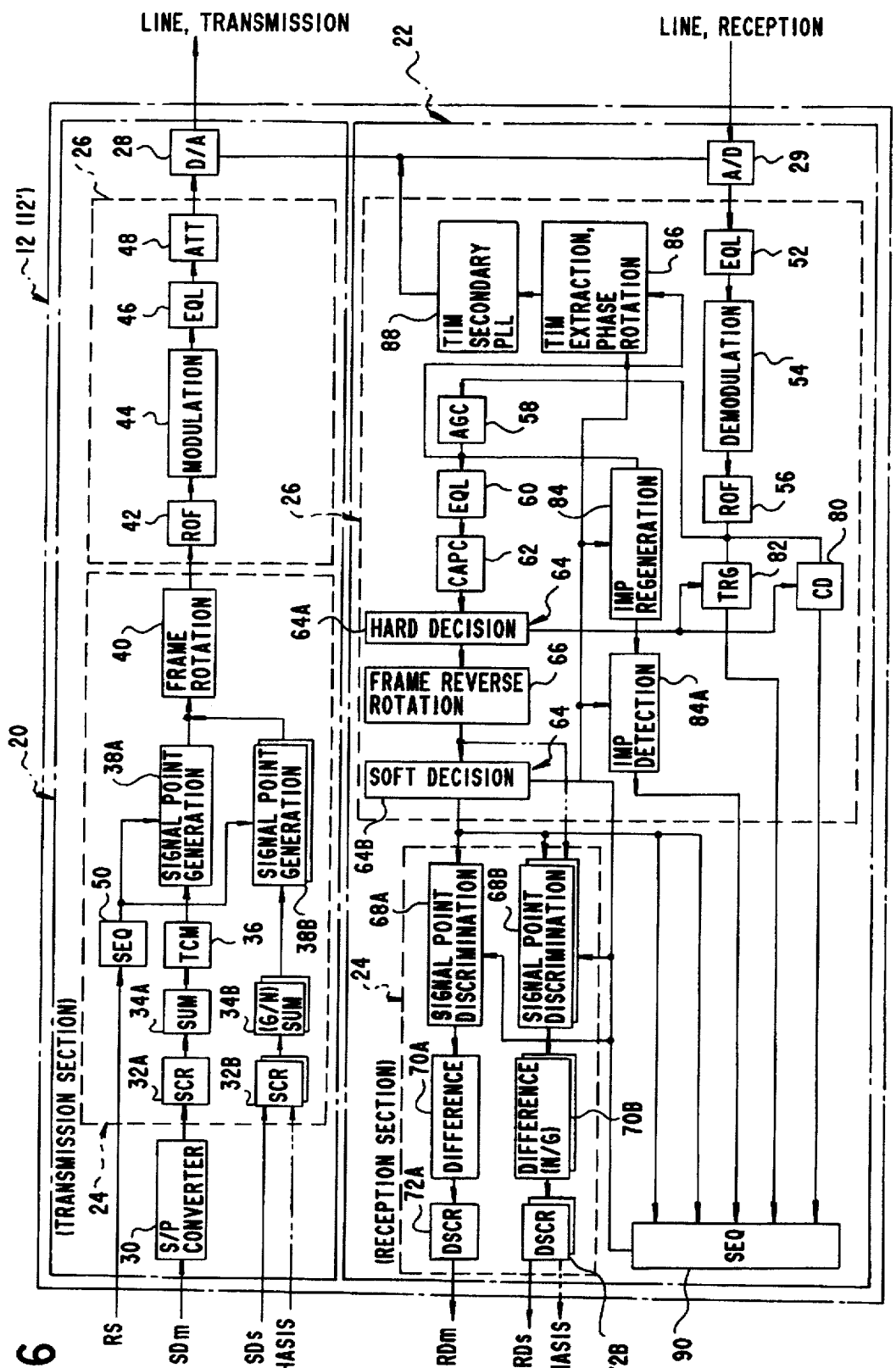
FIG. 6 is a block diagram showing details of the modem shown in FIG. 4.

The modem 12 which serves as a parent station includes, in order to exhibit the functions described above, a transmission section 20 with a modulation function and a reception section 22 with a demodulation function as shown in FIG. 6, and further includes a transmission low-pass filter and a transmission amplifier (not shown) on the output side of the transmission section 20 and a reception amplifier and a reception low-pass filter (not shown) on the input side of the reception section 22.

Figure 5:
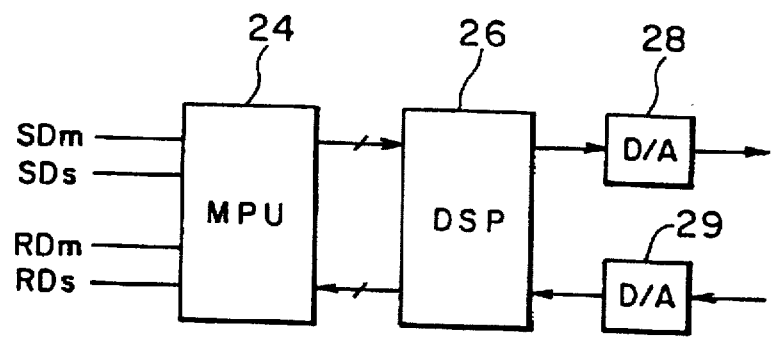
FIG. 5 is a block diagram showing a construction of a component of a modem employed in the on-line system of FIG. 4.

Each of the transmission section 20 and the reception section 22 is formed from, as shown in FIG. 5, a microprocessor unit (MPU) 24, a digital signal processor (DSP) 26, a digital to analog converter (D/A) 28 and an analog to digital converter (A/D) 29. Each of the MPU 24 and the DSP 26 constituting the transmission section 20 or the reception section 22 is provided suitably by a plural number depending upon the capacity or the processing capability required therefor.

Essential part of the modem 12 will be described in more detail. Referring to FIG. 6, the transmission section 20 of the modem 12 includes a serial to parallel converter (S/P converter) 30, a pair of scramblers (SCR) 32A and 32B, a pair of sum calculation sections 34A and 34B, a trellis-coded modulation section (TCM) 36, a pair of signal point generation sections 38A and 38B, a frame rotation section 40, a roll-off filter (ROF) 42, a modulation section 44, a fixed equalization section (EQL) 46, an attenuator (ATT) 48, a sequencer (SEQ) 50 serving as a control section, and so forth.

The serial to parallel converter 30 converts main channel data SDm from serial data into parallel data. The scramblers 32A and 32B individually randomize signals (main channel data SDm and secondary data SDs, and pre-emphasis data).

The sum calculation section 34A performs a sum calculation of the output of the scrambler 32A while the other sum calculation section 34B performs a sum calculation of the output of the scrambler 32B. The sum calculation section 34B also has a gray to natural code conversion function which is used upon training. The reason why the sum calculations of the two data are performed by the sum calculation sections 34A and 34B is that the transmission data are transmitted as relative difference data regarding preceding and following points of time. The trellis-coded modulation section 36 performs processing for correction of errors.

The signal point generation sections 38A and 38B generate desired signal points from the main channel data SDm and the secondary data SDs, respectively, but produce, upon initialization, training data, which will be hereinafter described, in response to a control signal from the sequencer 50.

The frame rotation section 40 rotates a frame in order to perform re-leading-in when a step-out occurs. The roll-off filter 42 passes only signals of a digital output within a predetermined frequency range therethrough and thus has a function of a low-pass filter.

The modulation section 44 performs modulation processing of the output of the roll-off filter 42 and has a carrier frequency set, for example, to 1,850 Hz.

The fixed equalization section 46 equalizes a delay, an amplitude component on a line and so forth. The attenuator 48 adjusts the level of the output of the fixed equalization section 46.

The sequencer 50 serving as a control section controls the function sections 30 to 48 of the transmission section 20 described above. The sequencer 50 also controls, upon initialization, the signal point generation sections 38A and 38B so as to produce training data which will be hereinafter described. Details of the control will be hereinafter described in detail.

The functions of the scramblers 32A and 32B, sum calculation sections 34A and 34B, trellis-coded modulation section 36, signal point generation sections 38A and 38B, frame rotation section 40 and sequencer 50 of the transmission section 20 are provided by the MPU 24, and the functions of the roll-off filter 42, modulation section 44, fixed equalization section 46 and attenuator 48 are provided by the DSP 26.

The reception section 22 of the modem 12 includes a fixed equalizer (EQL) 52, a demodulation section 54, a roll-off filter (band separation filter) (ROF) 56, an automatic gain control section (AGC) 58, an automatic equalization section (EQL) 60, a carrier phase correction section (CAPC) 62, a hard decision section 64A, a frame reverse rotation section 66, a soft decision section 64B, a pair of signal point discrimination sections 68A and 68B, a pair of difference calculation sections 70A and 70B, and a pair of descramblers 72A and 72B. The reception section 22 further includes a carrier detection section (CD) 80, a training data detection section (TRG) 82, an impulse (IMP) regeneration section 84, an impulse (IMP) detection section 84A, a timing (TIM) extraction section 86, a timing locking section (TIM secondary PLL) 88, a sequencer (SEQ) 90 serving as a control section, and so forth.

The fixed equalizer 52 equalizes a delay, an amplitude component on a line and so forth. The demodulation section 54 demodulates a reception signal after converted into a digital signal by the analog to digital converter 29. The roll-off filter 56 passes only a signal of the digital output of the demodulation section 54 within a predetermined frequency range, and a decimation filter is used for the roll-off filter 56.

The automatic gain control section 58 constructs automatic reception level adjustment means which adjusts the loop gain so that the level of a demodulated signal bandlimited by the roll-off filter 56 may be a predetermined reference value and inputs the demodulated signal of the thus adjusted level to the automatic equalization section 60 at the following stage. The automatic gain control section 58 is thus required to allow the automatic equalization section 60 at the following stage to operate accurately.

The automatic equalization section (automatic equalizer) 60 performs equalization processing to correct a transmission distortion of a line and so forth. The carrier phase correction section 62 which serves as a carrier phase control circuit forecasts a frequency offset, phase jitters or a phase intercept variation from the output of the automatic equalization section 60 and removes (or suppresses) the same to correct the carrier phase as hereinafter described.

The hard decision section 64A outputs a false reference signal corresponding to an input signal thereto. The soft decision section 64B receives the false reference signal from the hard decision section 64A and performs viterbi decoding or the like to correct an error of an input signal thereto. The hard decision section 64A and the soft decision section 64B function each as a pre-signal discrimination section 64.

The frame reverse rotation section 66 is provided to eliminate a step-out condition. The signal point discrimination section 68A discriminates signal points of main data while the other signal point discrimination section 68B discriminates signal points of secondary data in an ordinary operation. However, upon training, the signal point discrimination section 68B discriminates four values of the output of the frame reverse rotation section 66 (secondary data which have not undergone discrimination by the soft decision section 64B).

The difference calculation section 70A performs a difference calculation of the output of the signal point discrimination section 68A while the other difference calculation section 70B performs a difference calculation of the output of the signal point discrimination section 68B. The difference calculation section 70B also has a natural to gray code conversion function which is used upon training. The difference calculation sections 70A and 70B have a function of returning transmitted relative difference data into original data.

The descramblers 72A and 72B process signals randomized by the scramblers 32A and 32B to obtain original signals and output the thus obtained signals as main data RDm and secondary data RDs, respectively.

The carrier detection section 80 detects a carrier to detect whether or not data are received. The output of the carrier detection section 80 is supplied to the sequencer 90.

The training data detection section 82 detects training data to detect the beginning of training. Also the output of the training data detection section 82 is supplied to the sequencer 90.

The impulse regeneration section 84 regenerates an impulse from training data, and the impulse detection section 84A detects the impulse regenerated by the impulse regeneration section 84. Also the output of the impulse detection section 84A is supplied to the sequencer 90.

The timing extraction section 86 extracts a signal timing from the output of the automatic gain control section 58 and discriminates at which position the signal timing is. The timing locking section 88 locks the output of the timing extraction section 86 using a PLL (phase-locked loop) circuit.

The sequencer 90 serving as a control section controls the function units 52 to 88 of the reception section 22 described above.

It is to be noted that each alternate long and two short dashes line of the secondary data transmission and reception systems shown in FIG. 6 represents a flow of a signal or data upon training.

The functions of the fixed equalizer 52, demodulation section 54, roll-off filter 56, automatic gain control section 58, automatic equalization section 60, carrier phase correction section 62, hard decision section 64A, frame reverse rotation section 66, soft decision section 64B, carrier detection section 80, training data detection section 82, impulse regeneration section 84, impulse detection section 84A, timing extraction section 86 and timing locking section 88 of the reception section 22 are provided by the DSP 26, and the functions of the signal point discrimination sections 68A and 68B, difference calculation sections 70A and 70B, and descramblers 72A and 72B are provided by the MPU 24.

It is to be noted that also the modem 12' serving as a child station has the same construction as that of the modem 12 serving as a parent station, and accordingly, overlapping description of the same is omitted herein to avoid redundancy.

Subsequently, a phase jitter cancellation circuit 62A which forms the carrier phase correction section 62 will be described in detail.

Figure 7:
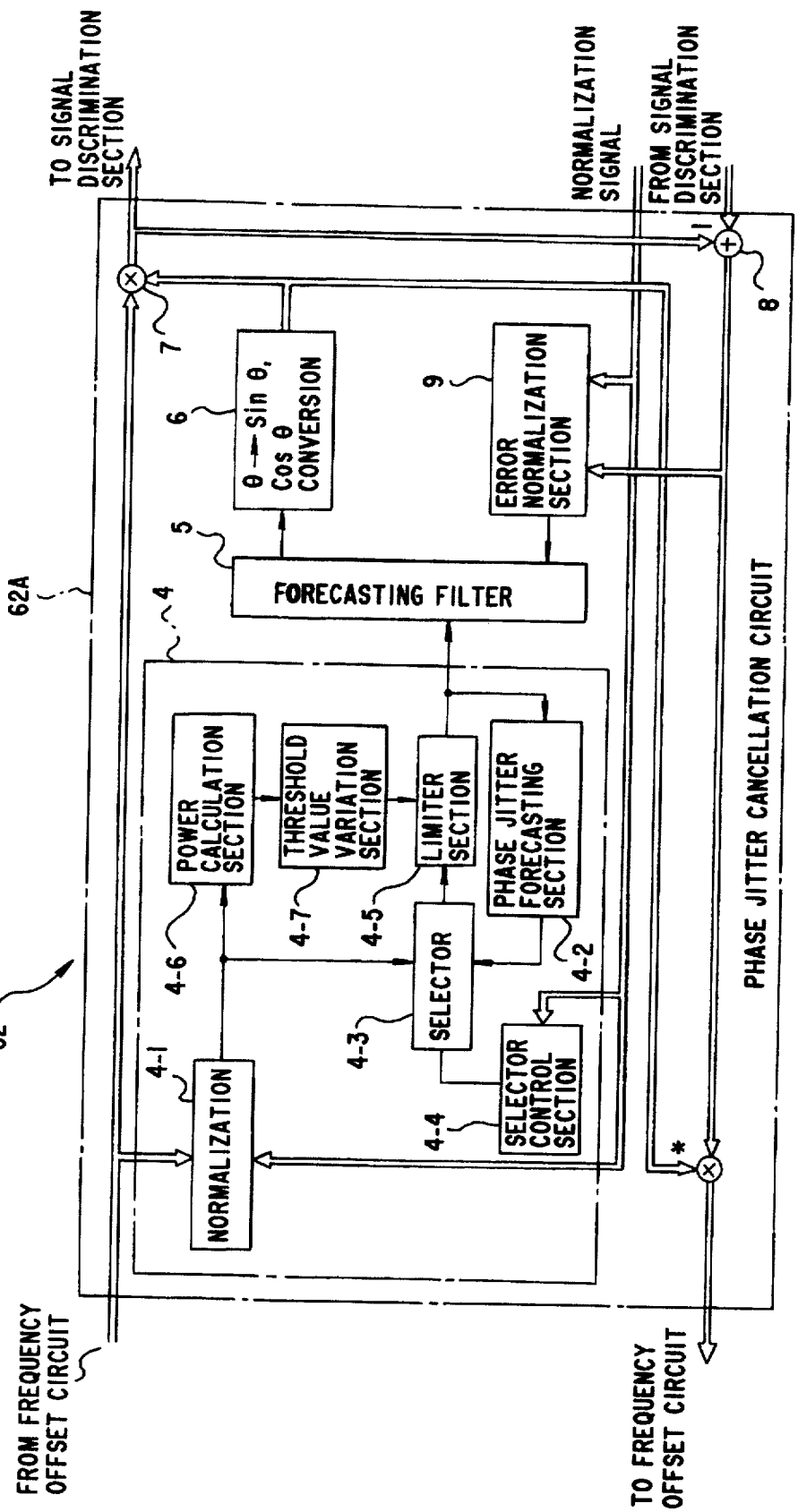
FIGS. 7 and 8 are block diagrams showing a phase jitter cancellation circuit of the modem shown in FIG. 6.
Figure 8:
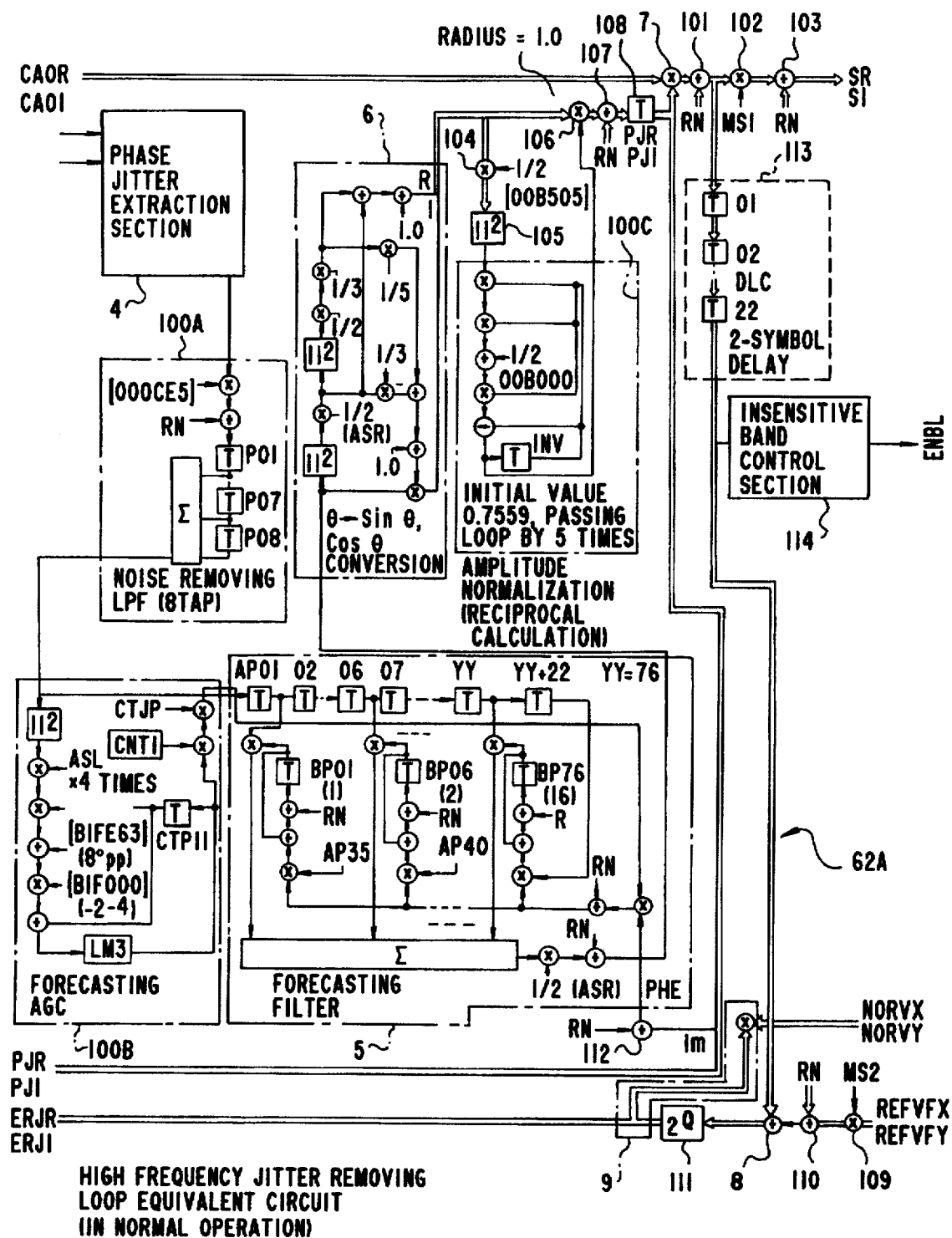

Referring to FIG. 7, the phase jitter cancellation circuit 62A shown extracts phase jitters produced in a transmission line and outputs a signal for suppressing the phase jitters. To this end, the phase jitter cancellation circuit 62A particularly has, for example, such a construction as shown in FIG. 8.

It is to be noted that, at the stage preceding to the phase jitter cancellation circuit, a frequency offset circuit which constructs the carrier phase correction section 62 together with the phase jitter cancellation circuit 62A is provided.

The phase jitter cancellation circuit 62A shown in FIG. 7 includes a phase jitter extraction section 4 which extracts phase jitters from input/output information of a signal discriminator 64 (refer to FIG. 6; hard decision section 64A and soft decision section 64B). The phase jitter extraction section 4 includes a phase jitter detection section (normalization section) 4-1, a phase jitter forecasting section 4-2, a selector 4-3, a selector control section 4-4, a limiter section 4-5, a power calculation section 4-6 and a threshold value variation section 4-7.

The phase jitter cancellation circuit 62A further includes a forecasting filter 5 for calculating phase information to cancel phase jitters extracted by the phase jitter extraction section 4, and a conversion section 6 for converting the output of the forecasting filter 5 into a vector.

The phase jitter cancellation circuit 62A further includes a multiplication section 7 for multiplying the signal for cancellation of phase jitters from the conversion section 6 and a signal from the frequency offset circuit and outputting a signal of a result of the multiplication, an addition section 8 for adding the output of the multiplication section 7 and the output of the signal discrimination section 64 (hard and soft decision sections 64A and 64B), and an error normalization section 9 for receiving, as inputs thereto, the output of the addition section 8 and a normalization signal and normalizing error information.

Figure 9:
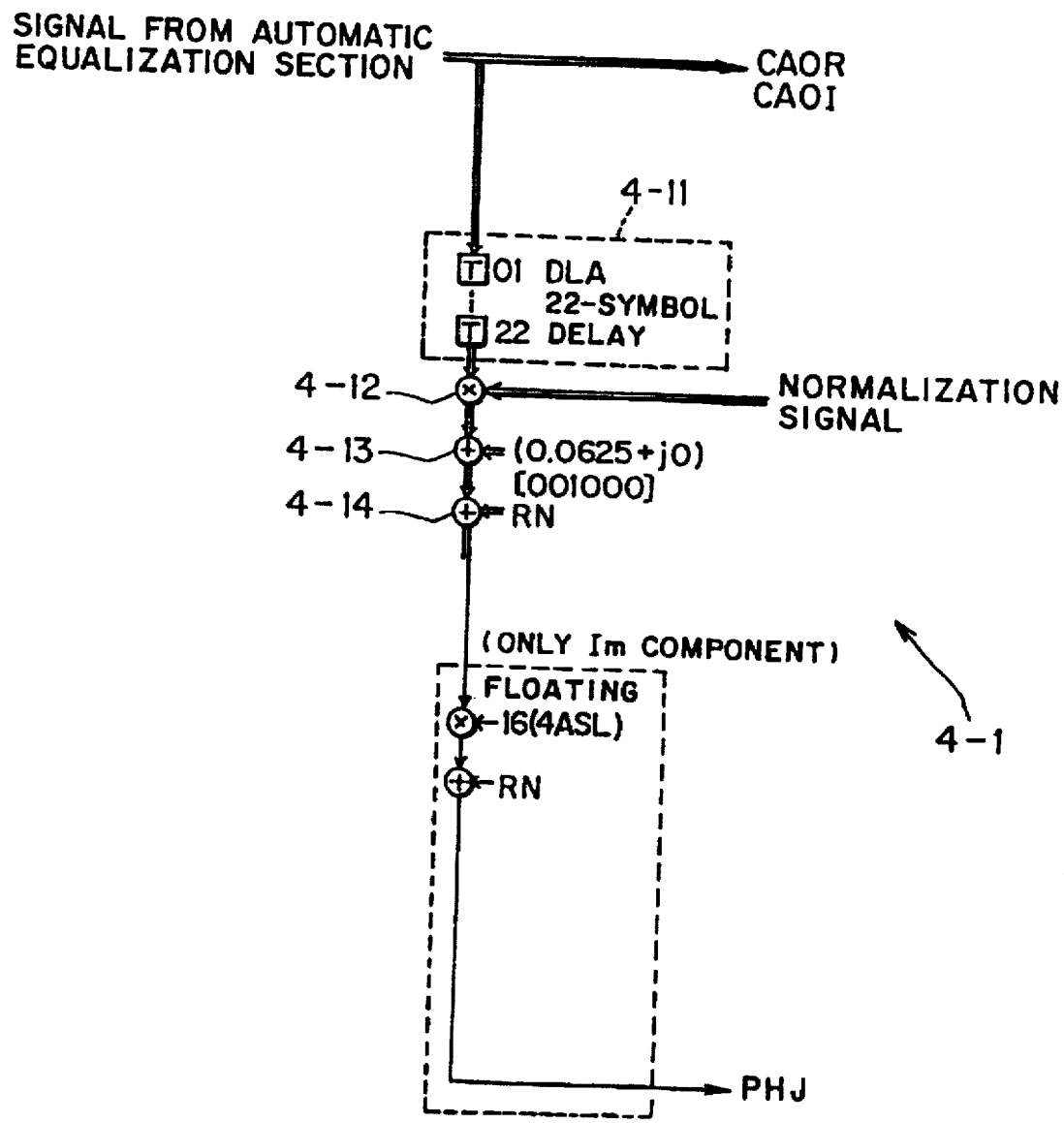
FIGS. 9 and 10 are diagrammatic views showing details of a phase jitter extraction section of the phase jitter cancellation circuit shown in FIGS. 7 and 8.
Figure 10:
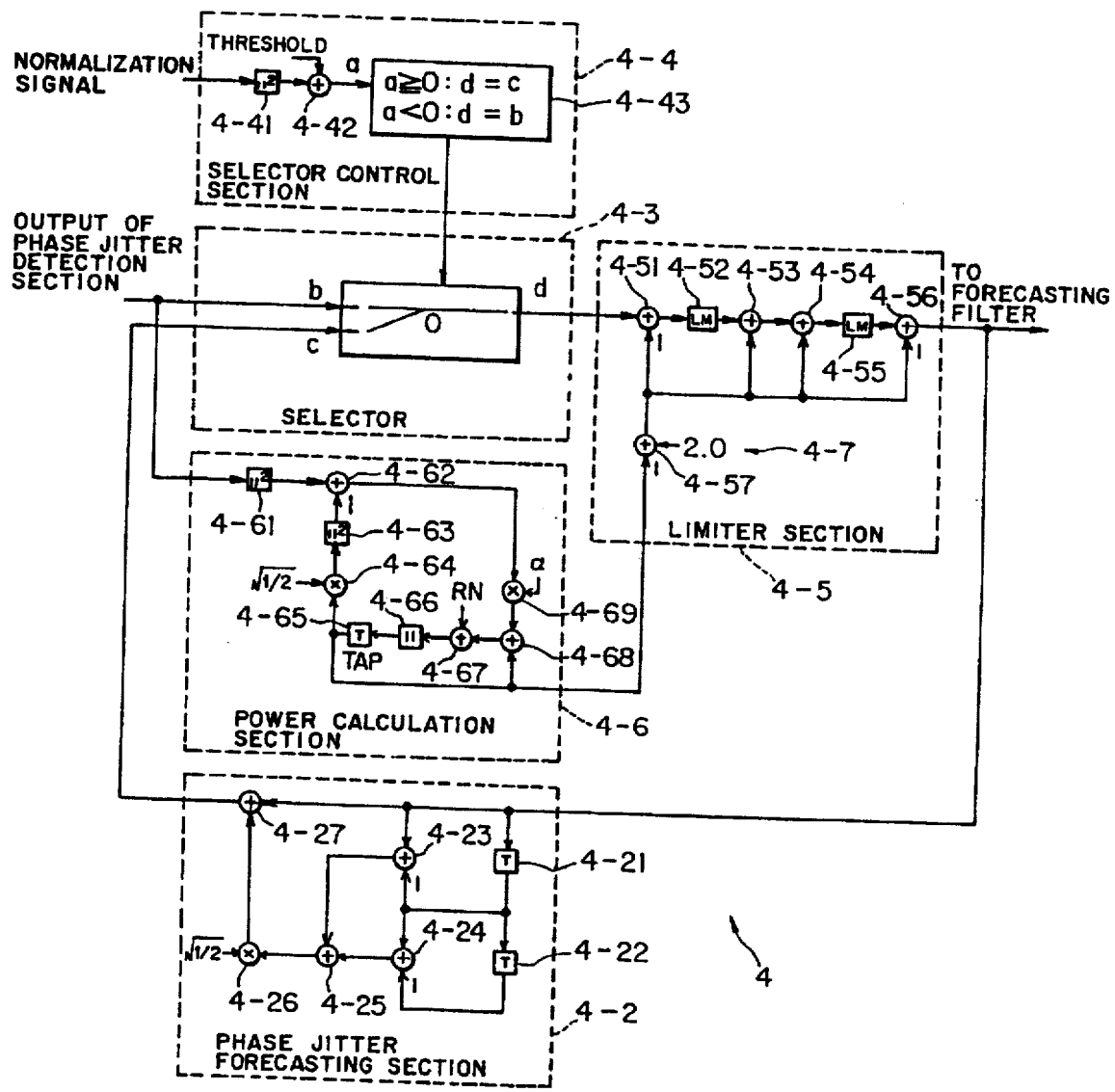

The phase jitter extraction section 4 has such a detailed construction as shown in FIGS. 9 and 10.

It is to be noted that, in FIGS. 8 to 10, each element denoted by the reference symbol "+" is an addition section; denoted by "×" is a multiplication section; denoted by "T" is a delay section; denoted by the reference symbols "+" and "RN" is a rounding processing section; denoted by the reference character "| |$^2$" is an absolute value squaring calculation section; denoted by "Σ" is a totalling calculation section; and denoted by "LM" is a limiter.

Referring to FIGS. 9 and 10, the phase jitter detection section (normalization section) 4-1 of the phase jitter extraction section 4 detects phase jitters normalized to a predetermined position on a vector plane from input/output information of the signal discriminator 3. In particular, referring to FIG. 9, the phase jitter detection section 4-1 includes a delay section 4-11, a multiplication section 4-12, an addition section 4-13, a rounding section 4-14 and a floating calculation section 4-15.

In the phase jitter extraction section 4 shown in FIG. 9, the delay section 4-11 delays a signal from the frequency offset circuit, and the multiplication section 4-12 multiplies the thus delayed signal and the normalization signal. The addition section 4-13 normalizes the signal obtained by the multiplication from the multiplication section 4-12 on an X-axis (0.0625+j0), and the rounding section 4-14 performs rounding processing of the normalized signal from the addition section 4-13. The floating calculation section 4-15 performs multiplication only of the imaginary component of the normalized vector signal from the rounding section 4-14 by 16 to change the radius to 1.0 and outputs a resulted value as an output of the phase jitter detection section 4-1.

Meanwhile, the phase jitter forecasting section 4-2 forecasts phase jitters, which are to be produced at present, from the normalized phase jitters detected by the phase jitter detection section 4-1. In other words, outputs of the limiter section 4-5 in the past are stored once and then added and averaged to forecast a normalization output at present.

The phase jitter forecasting section 4-2 particularly includes, as shown in FIG. 10, a pair of delay sections 4-21 and 4-22, three addition sections 4-23 to 4-25, a multiplication section 4-26 and another addition section 4-27.

In particular, in the phase jitter forecasting section 4-2, a variation in phase of the limiter output in the past is calculated by the delay section 4-21 and the addition section 4-23 based on an output of the limiter section 4-5 in the past as normalized phase jitters from the phase jitter detection section 4-1, and a phase variation of another limiter output older than the limiter output in the past calculated by the delay section 4-21 and the addition section 4-23 is calculated by the delay section 4-22 and the addition section 4-24.

Then, the two phase variations described above are averaged by the addition section 4-25 and the multiplication section 4-26, and the average value thus obtained is added to the latest limiter output by the addition section 4-27 and a resulted value is outputted as a forecast value of the output of the normalization section at present.

Further, as seen in FIG. 10, the selector 4-3 selectively outputs one of the phase jitters b from the phase jitter detection section 4-1 and the forecast phase jitter c obtained by the phase jitter forecasting section 4-2 in accordance with a control signal from the selector control section 4-4. Consequently, expansion of noise by multiplication of the normalization signal and the signal from the phase jitter detection section 4-1 from which the frequency offset of the equalization output signal has been cancelled can be prevented.

The selector control section 4-4 discriminates a region of signal points sent thereto by way of the transmission line and controls the selector 4-3 based on a result of the discrimination. Referring to FIG. 10, the selector control section 4-4 includes an absolute value squaring calculation section 4-41, an addition section 4-42 and a discrimination section 4-43.

In particular, the normalization signal from the signal discrimination section 64 is inputted to the absolute value squaring calculation section 4-41 of the selector control section 4-4, by which an absolute value of the normalization signal is squared to calculate a power of the normalization signal, and a result of the calculation is added to a threshold value be the addition section 4-42.

A result a of the addition by the addition section 4-42 is inputted to the discrimination section 4-43, by which it is discriminated based on the value of the result a of addition which one of the normalization signal and the threshold value is greater in magnitude.

When the value of the calculation result a is equal to or higher than "0", that is, when the power of the normalization signal is higher than the threshold value, the signal from the phase jitter forecasting section 4-2 is selected and outputted by the selector 4-3. On the contrary, when the value of the calculation result a is lower than "0", that is, when the power of the normalization signal is lower than the threshold value, the signal from the phase jitter detection section 4-1 is selected and outputted by the selector 4-3.

The power calculation section (power detection section) 4-6 detects (calculates) a power of the normalized phase jitters detected by the phase jitter detection section 4-1. Referring to FIG. 10, the power calculation section 4-6 particularly includes an absolute value squaring calculation section 4-61, an addition section 4-62, another absolute value squaring calculation section 4-63, a multiplication section 4-64, a tap section 4-65, an absolute value calculation section 4-66, a rounding section 4-67, another addition section 4-68 and another multiplication section 4-69.

In particular, calculations described below are performed to calculate the value of A so that noise included in the output (Asinθ) of the phase jitter detection section 4-1 may be limited within A and −A by the limiter section 4-5 which will be hereinafter described.

More particularly, a signal (imaginary component) from the phase jitter detection section 4-1 is inputted to the power calculation section 4-6, and such a squaring calculation of an absolute value as given by expression (1) below is performed by the absolute value squaring calculation section 4-61. Then, a result of the calculation by the absolute value squaring calculation section 4-61 is integrated by the tap section 4-65, the absolute value calculation section 4-66, the rounding section 4-67 and the addition section 4-68 to obtain the value of A at the tap section 4-65.

$$(A\sin\theta)^2 = A^2 \sin^2\theta$$

Here, since $\sin^2\theta = -(1/2)*(\cos 2\theta - 1)$, $$A^2\sin^2\theta = -(A^2/2)*(\cos 2\theta - 1)$$
$$= -A^2\cos(2\theta)/2 + (A^2/2)$$

Here, since integration of $\cos 2\theta$ results in 0, $$(A\sin\theta)^2 = A^2/2 \qquad (1)$$

Further, the tap TAP stored in the tap section 4-65 is multiplied by $(1/2)^{1/2}$ by the multiplication section 4-64, and from a result of the multiplication by the multiplication section 4-64, $TAP^2/2$ is obtained by the absolute value squaring calculation section 4-63.

Then, the addition section 4-62 calculates, in accordance with expression (2) below, a difference between the output of the absolute value squaring calculation section 4-61 as a squared value of the input signal to the power calculation section 4-6 and the output of the absolute value squaring calculation section 4-63 and outputs it as an error value.

$$\text{error} = (A^2/2) - (TAP^2/2) \qquad (2)$$

When the error value from the addition section 4-62 is in the positive in sign (when the squared value of the input to the power calculation section 4-6, that is, $A^2/2$, is higher than $TAP^2/2$), the error value is multiplied by a controlling force α by the multiplication section 4-69, and a result of the multiplication is added to the tap TAP of the tap section 4-65. Consequently, the value of the tap TAP is controlled so as to increase.

On the other hand, when the error value is in the negative in sign (when $A^2/2$ is lower than $TAP^2/2$), the error value is multiplied by the controlling force a by the multiplication section 4-69, and a result of the multiplication is added to the tap TAP of the tap section 4-65. Consequently, the value of the tap TAP is controlled so as to decrease.

Consequently, the multiplication section 4-69 controls so that the error value from the addition section 4-62 may approach 0, that is, the value of the tap TAP of the tap section 4-65 may approach the value A.

The limiter section 4-5 determines a threshold value (TAP) based on the output of the power calculation section 4-6 and suppresses noise components higher than the threshold value. In other words, the limiter section 4-5 performs limitation processing so that the output of the selector 4-3 may be included in a range defined by required threshold values, and outputs a resulted signal to the forecasting filter 5. Referring to FIG. 10, the limiter section 4-5 includes four addition sections 4-51, 4-53, 4-54 and 4-56 and a pair of limiters (LM) 4-52 and 4-55.

Figure 17:
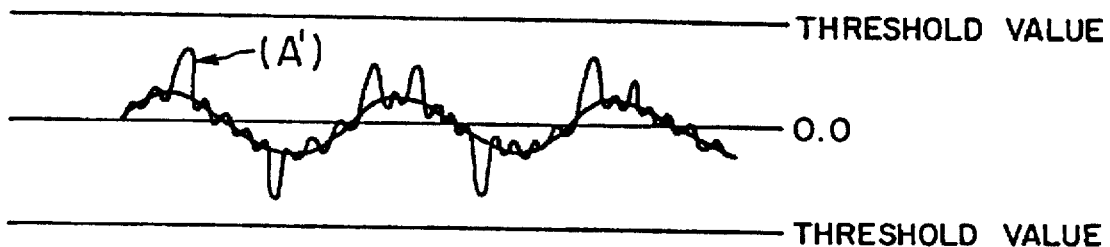

In particular, the limiter section 4-5 performs limitation processing to an inputted signal based on the values of the limiter value TAP from the tap section 4-65 of the power calculation section 4-6 and outputs a resulted signal so that noise components can be suppressed effectively even when a waveform of a low input level includes such a high noise component as indicated, for example, by A' in FIG. 17.

It is to be noted that, although a DSP which forms the phase jitter cancellation circuit of the present embodiment can have the values of "±2.0", it can have the values of "±4.0" immediately after the calculation. Accordingly, the limiter section 4-5 executes a command of, for example, "MOV D. D" as a command of the DSP to limit any value outside "±2.0" to "±2.0".

For example, when the input from the selector 4-3 is "1.8" and the value of the tap TAP from the tap section 4-65 of the power calculation section 4-6 is "1.2", the tap TAP is inputted to an addition section 4-57 of the limiter section 4-5, by which the difference between "2.0" and the tap TAP is calculated as given by the following equation (3):

$$2.0-1.2=0.8 \quad (3)$$

Meanwhile, the addition section 4-51 calculates the difference between the input from the selector 4-3 and the result of calculation from the addition section 4-57 as given by the following equation (4), $$1.8-0.8=1.0 \quad (4)$$

and a result of the calculation is limited to "1.0" by the limiter 4-52.

Then, the addition section 4-53 adds the output of the limiter 4-52 and the output of the addition section 4-57 as given by the following expression (5):

$$1.0+0.8=1.8 \quad (5)$$

while the addition section 4-54 adds the output of the addition section 4-53 and the output of the addition section 4-57 as given by the expression (6):

$$1.8+0.8=2.6 \quad (6)$$

Further, the output "2.6" of the addition section 4-54 is inputted to the limiter 4-55. In this instance, the value "2.6" is limited with the threshold value "2.0" and consequently to "2.0" by the limiter 4-55.

Then, the output "2.0" of the limiter 4-55 is inputted to the addition section 4-56, by which the difference thereof from the output of the addition section 4-57 is calculated as given by the following expression (7):

$$2.0-0.8=1.2 \quad (7)$$

Consequently, the input (1.8) from the selector 4-3 is limited with the value of the tap TAP from the power calculation section 4-6 and is thus outputted as "1.2".

Accordingly, the addition section 4-57 described above functions as the threshold value variation section 4-7 which varies the threshold value of the limiter section 4-5 based on the power of the normalized phase jitters detected by the power calculation section 4-6.

It is to be noted that the limiter section 4-5 limits the input thereto with the value of −TAP if the input is in the negative in sign. In particular, also when a negative value "−1.6" is inputted from the selector 4-3, if processing is performed in a similar manner, the value is limited with the value 1.2 of the power calculation section TAP, and consequently, the value "−1.2" is outputted.

Accordingly, in the phase jitter extraction section 4, the forecast phase jitters from the phase jitter forecasting section 4-2 or the phase jitters from the phase jitter detection section 4-1 can be selectively outputted by the selector 4-3 in response to a result of discrimination of the region of signal points by the selector control section 4-4.

In particular, the selector 4-3 selects the output of the phase jitter detection section 4-1 when the squared value of the normalization signal is lower than the threshold value, but selects the output of the phase jitter forecasting section 4-2 when the squared value is equal to or higher than the threshold value.

It is to be noted that phase jitters detected by the phase jitter detection section 4-1 can be outputted from the phase jitter extraction section 4 after they are limited by the limiter section 4-5 based on the power of the phase jitters calculated by the power calculation section 4-6.

By the way, the phase jitter cancellation circuit 62A of the present embodiment can be modified such that, as shown in FIG. 8, a noise removing LPF (Low Pass Filter) 100A and a forecasting AGC 100B (not shown in FIG. 7) are interposed between the phase jitter extraction section 4 and the forecasting filter 5 and an initial value amplitude normalization section 100C is interposed between the conversion section 6 and the multiplication section 7.

It is to be noted that, in FIG. 8, reference numerals 101 and 103 denote each a rounding processing section, reference numeral 102 denotes a multiplication section, 104 another multiplication section, 105 an absolute value squaring calculation section, 106 a further multiplication section, 107 another rounding processing section, 108 a delay section, 109 a still further multiplication section, 110 a further rounding processing section, 111 a bit expansion section for expanding bits of an error signal, 112 a still further rounding processing section, 113 another delay section, and 114 an insensitive band control section.

In the modem in which the carrier phase correction section 62 described above is incorporated, communication of data is performed in the following manner.

In particular, in the transmission section 20, main channel data SDm are converted from serial data into parallel data by the serial to parallel converter 30, and the parallel data are scrambled by the scrambler 32A. Then, a sum calculation of the output of the scrambler 32A is performed by the sum calculation section 34A to produce relative difference data, and the relative difference data are processed so as to correct errors by the trellis-coded modulation section 36. Then, desired signal points are generated based on the output of the trellis-coded modulation section 36 by the signal point generation section 38A.

Meanwhile, also secondary data SDs are scrambled by the scrambler 32B, and a sum calculation of the output of the scrambler 32B is performed by the sum calculation section 34B to produce relative difference data. Then, desired signal points are generated based on the relative difference data by the signal point generation section 38A.

Thereafter, the two signals generated as described above are supplied by way of the frame rotation section 40 to the roll-off filter 42, by which filtering processing thereof is performed. A resulted signal from the roll-off filter 42 is modulated by the modulation section 44. Further, the modulated signal is equalized in terms of a delay, an amplitude component on a line and so forth by the fixed equalization section 46 and is then adjusted in level by the attenuator 48, whereafter it is converted from a digital signal into an analog signal by the digital to analog converter 28. The analog signal thus obtained is transmitted in accordance with a non-Nyquist transmission system by way of the line.

In the reception section 22, the received signal is converted from an analog signal into a digital signal by the analog to digital converter 29. The digital signal from the analog to digital converter 29 is equalized in terms of a delay, an amplitude component on a line and so forth by the fixed equalizer 52 and then demodulated by the demodulation section 54. The thus demodulated signal is filtered by the roll-off filter 56, and then, the loop gain thereof is adjusted by the automatic gain control section 58 so that the level of the demodulated signal may have a predetermined reference value to automatically adjust a reception level of a signal to be inputted to the automatic equalization section 60 at the following stage.

Then, equalization processing to correct a transmission distortion by the line and so forth is performed by the automatic equalization section 60, and then a frequency offset or a phase intercept variation is forecast and removed to correct a carrier phase by the carrier phase correction section 62 as described above, whereafter pre-signal discrimination is performed by the hard decision section 64A and then by the soft decision section 64B. Thereafter, the signal points of the main data are discriminated by the signal point discrimination section 68A while the signal points of the secondary data are discriminated by the signal point discrimination section 68B.

Thereafter, the main data and the secondary data are separately processed by difference calculation processing and descrambling processing.

Consequently, stabilized very high rate data transmission can be realized without using a data compression function, and the modem is provided with an improved reliability.

In this manner, the phase jitter cancellation circuit of the embodiment of the present invention is advantageous in that stabilized phase jitter cancellation can be achieved by suppressing noise of a signal from the phase jitter detection section 4-1, and this contributes to improvement in performance of a communication apparatus.

Further, since the selector control section 4-4 controls the selector 4-3 so that, when the power of the normalization signal is lower than the threshold value, the output of the phase jitter detection section 4-1 is selected by the selector 4-3, but when the power of the normalization signal is equal to or higher than the threshold value, the output of the phase jitter forecasting section 4-2 is selected, the phase jitter cancellation circuit of the embodiment of the present invention is advantageous in that expansion of noise by multiplication of the signal from which the frequency offset of the equalization output signal has been cancelled and the normalization signal by the phase jitter detection section 4-1 can be prevented.

Furthermore, since the power of the output of the phase jitter detection section 4-1 is calculated by the power calculation section 4-6 and is used as the threshold value of the limiter section 4-5, the phase jitter cancellation circuit of the embodiment of the present invention is advantageous in that noise components can be suppressed effectively even when a waveform of a low input level includes such a high noise component as indicated, for example, by A' in FIG. 17.

c. Others

Figure 11:
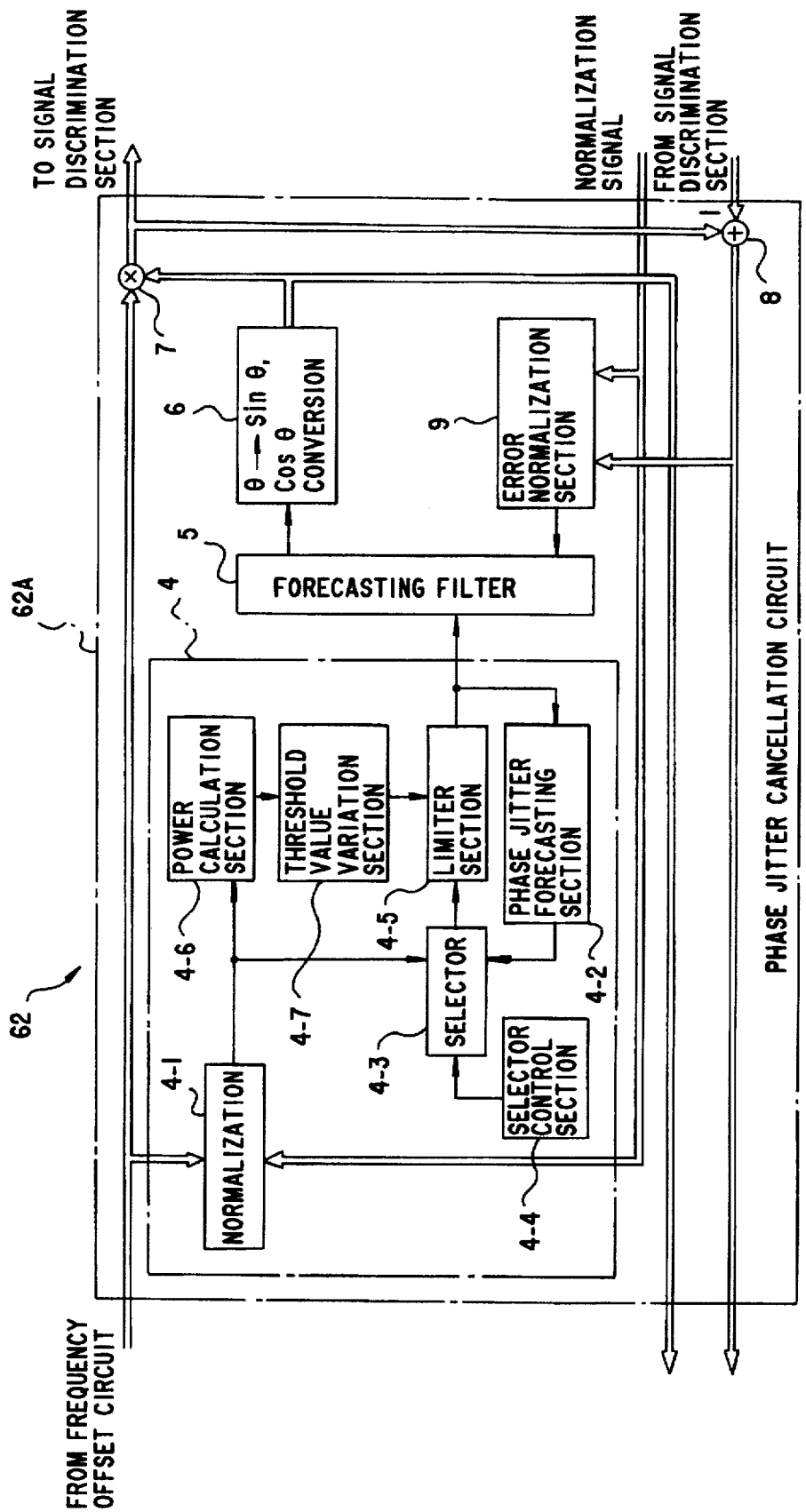
FIGS. 11 to 14 are block diagrams showing different phase jitter cancellation circuits to which the present invention is applied.
Figure 12:
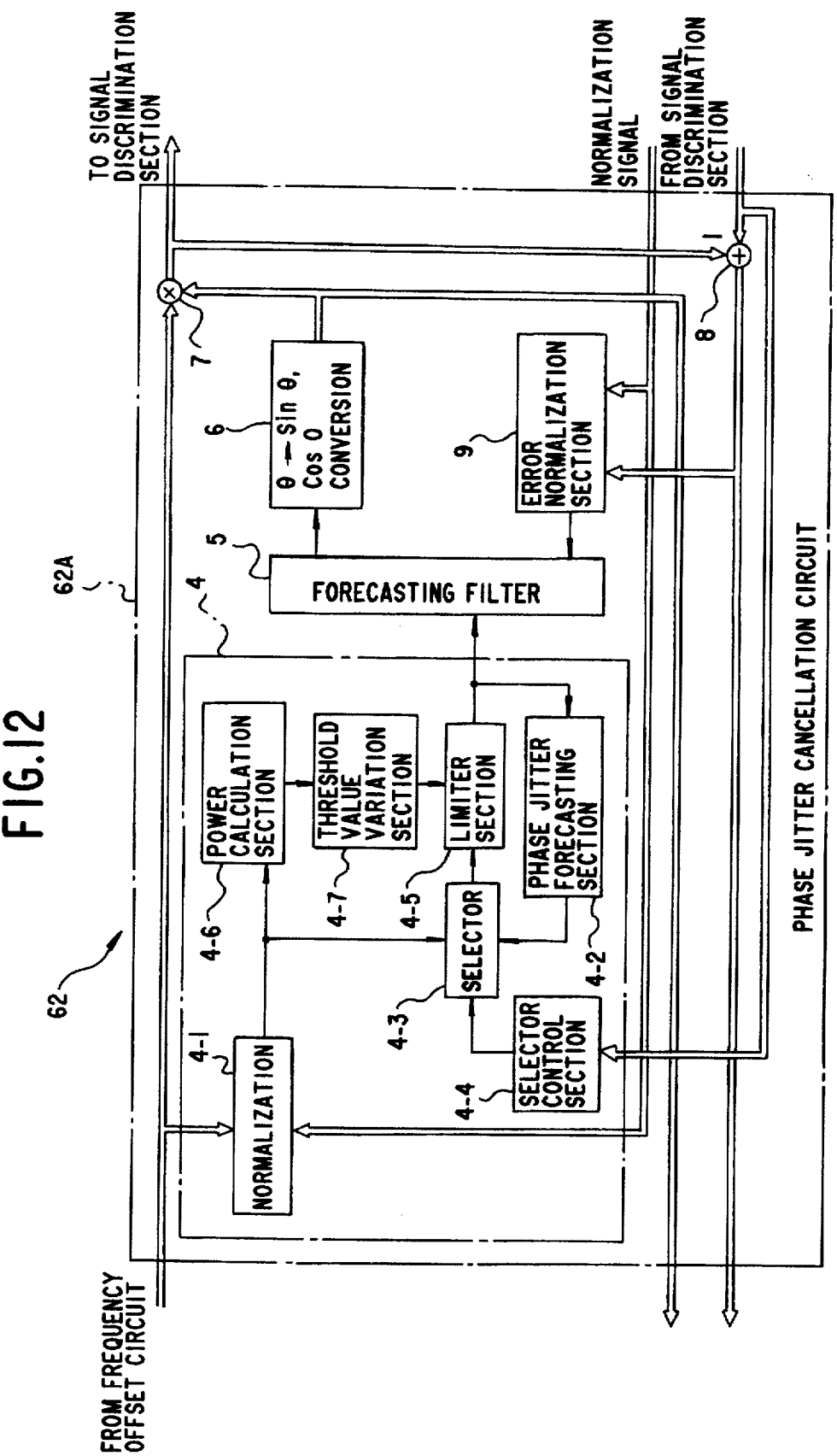
Figure 13:
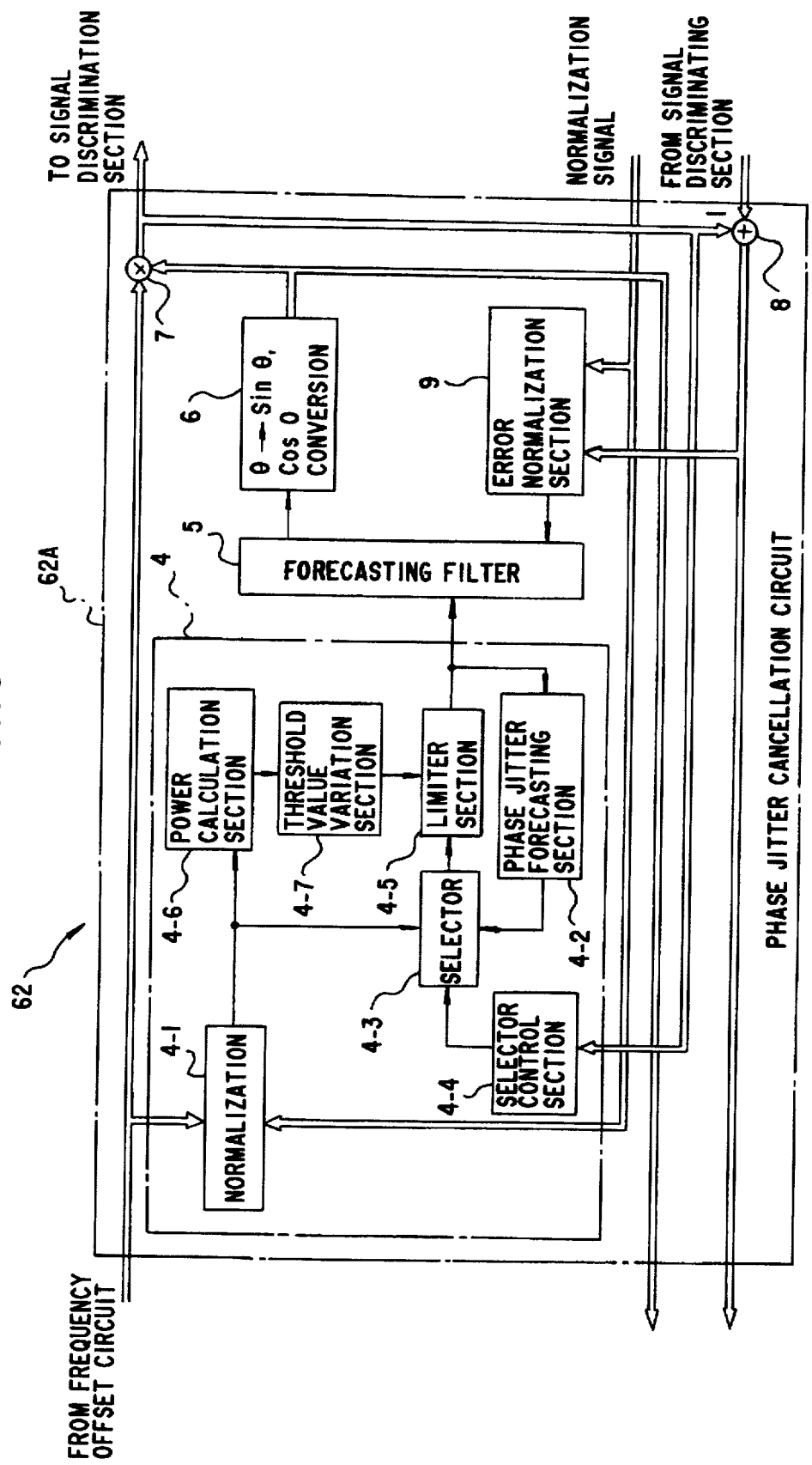

The phase jitter cancellation circuit of the embodiment described above may be modified such that a control parameter such as error information from the signal discrimination section 64 (refer to FIG. 12) or an output of the multiplication section 7 (refer to FIG. 13) as a signal after cancellation of phase jitters is inputted to the selector control section 4-4 so that the selector 4-3 is controlled in accordance with the control parameter or such that, as shown in FIG. 11, the selector control section 4-4 is formed as an independent control system which has a control parameter in the inside thereof. Any of the modifications just described is advantageous in that expansion of noise by multiplication of a signal from which a frequency offset of an equalization output signal has been cancelled and a normalization signal can be prevented and stabilized phase jitter cancellation can be achieved, which contributes to improvement in performance of a communication apparatus.

It is to be noted that, from the constructions shown in FIGS. 7, 11, 12 and 13, the power detection section and the threshold value variation section can be eliminated and also the limiter section can be omitted. The modified constructions just described are advantageous at least in that expansion of noise by multiplication of a signal from which a frequency offset of an equalization output signal has been cancelled and a normalization signal can be prevented.

Figure 14:
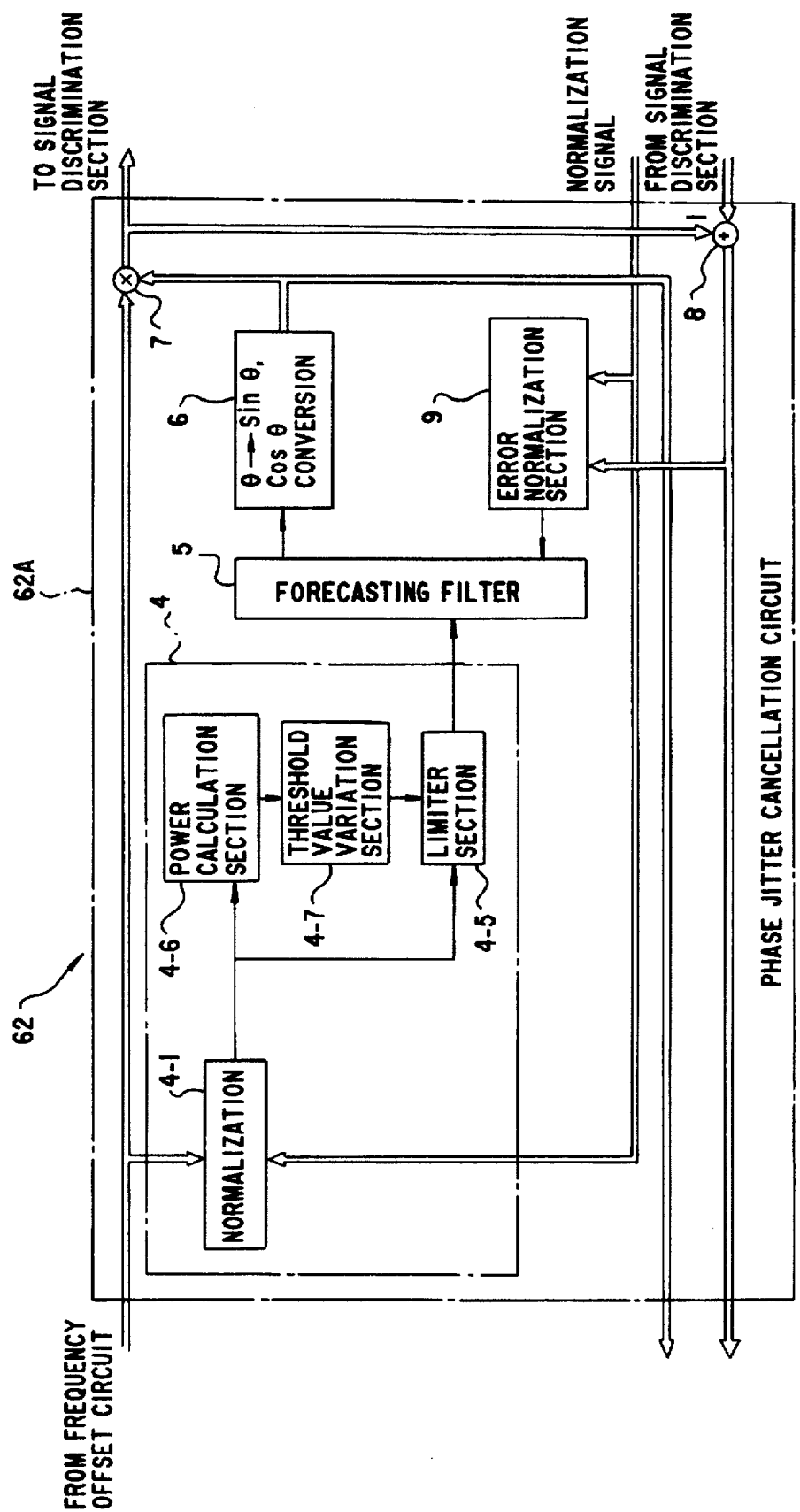
Figure 15:
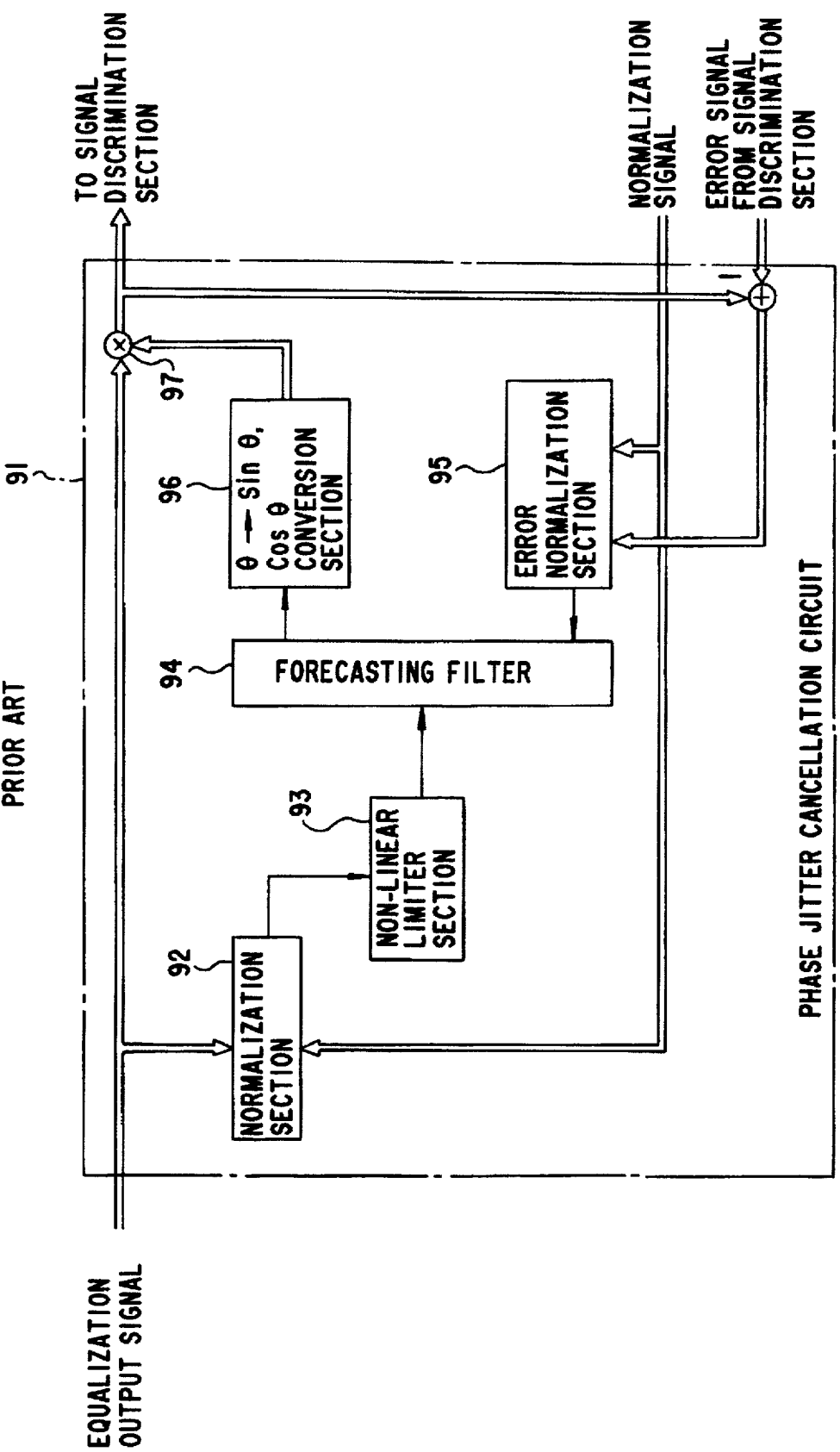
FIG. 15 is a block diagram showing an ordinary phase jitter cancellation circuit.
Figure 16:
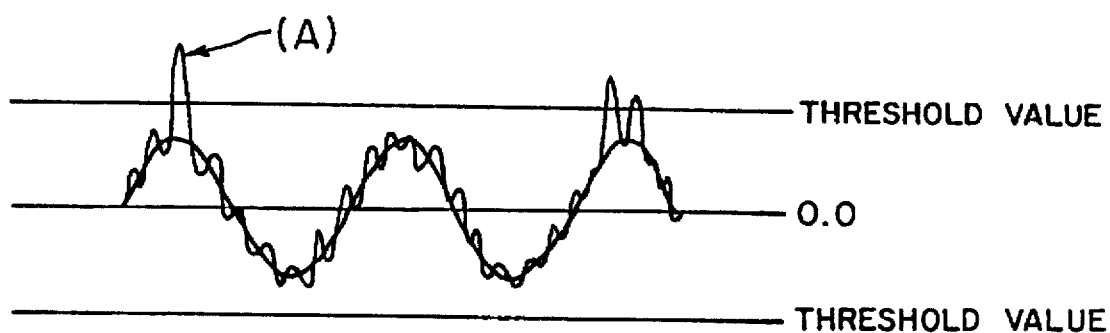
FIGS. 16 and 17 are waveform diagrams showing signal waves which include noise.

Further, the phase jitter cancellation circuit of the embodiment described above may be modified such that, as shown in FIG. 14, the phase jitter forecasting section, the selector and the selector control section shown in FIG. 7 are omitted. The modified phase jitter cancellation circuit just described is advantageous at least in that noise components can be suppressed effectively even when a waveform of a low input level includes a high noise component.

Further, while, in the embodiment described above, the present invention is applied to a reception section of a modem for communication of data in accordance with a non-Nyquist transmission system, the application of the present invention is not limited to reception sections of modems of the specific type, and similar advantages to those of the embodiment described above can be achieved also where the present invention is applied to communication apparatus by which data are communicated in accordance with the Nyquist transmission system.

The present invention is not limited to the specifically described embodiment, and variations and modifications may be made without departing from the scope of the present invention.

What is claimed is:

1. A phase jitter extraction circuit which is provided on a reception side of a communication apparatus and interposed between an automatic equalizer and a signal discriminator for extracting phase jitters produced in a transmission line, comprising:

a phase jitter detection section for detecting phase jitters from input/output information of said signal discriminator;

a phase jitter forecasting section for forecasting phase jitters which will be produced later from the phase jitters detected by said phase jitter detection section;

a selector for selectively outputting the phase jitters detected by said phase jitter detection section or the forecast phase jitters obtained by said phase jitter forecasting section; and a selector control section for discriminating a region of signal points received by said communication apparatus by way of said transmission line and controlling said selector in accordance with a result of the discrimination.

2. A phase jitter extraction circuit as claimed in claim 1, wherein said phase jitter detection section detects phase jitters normalized to a predetermined position of a vector plane from the input/output information of said signal discriminator.

3. A phase jitter extraction circuit as claimed in claim 1, wherein said phase jitter forecasting section adds and averages the phase jitters detected by said phase jitter detection section to forecast phase jitters which will be produced later.

4. A phase jitter extraction circuit as claimed in claim 1, wherein said selector control section includes a region discrimination section for discriminating a region of signal points received by said communication apparatus by way of said transmission line based on the output of said signal discriminator.

5. A phase jitter extraction circuit as claimed in claim 1, wherein said selector control section includes a region discrimination section for discriminating a region of signal points received by said communication apparatus by way of said transmission line based on a signal obtained by normalization of the output of said signal discriminator.

6. A phase jitter extraction circuit as claimed in claim 1, wherein said selector control section includes a region discrimination section for discriminating a region of signal points received by said communication apparatus by way of said transmission line based on a signal from which phase jitters have been cancelled.

7. A phase jitter extraction circuit which is provided on a reception side of a communication apparatus and interposed between an automatic equalizer and a signal discriminator for extracting phase jitters produced in a transmission line, comprising:

a phase jitter detection section for detecting phase jitters from input/output information of said signal discriminator;

a limiter section for limiting an output of said phase jitter detection section so as to fall within a range defined by a pair of threshold values;

a power detection section for detecting a power of the phase jitters detected by said phase jitter detection section; and a threshold value variation section for varying the threshold values of said limiter section based on the power of the phase jitters detected by said power detection section.

8. A phase jitter cancellation circuit which is provided on a reception side of a communication apparatus and interposed between an automatic equalizer and a signal discriminator for extracting phase jitters produced in a transmission line and outputting a signal to cancel the phase jitters, comprising:

a phase jitter extraction section for extracting phase jitters from input/output information of said signal discriminator;

a forecasting filter for calculating phase information to cancel the phase jitters extracted by said phase jitter extraction section; and a conversion section for converting an output of said forecasting filter into a vector;

said phase jitter extraction section including a phase jitter detection section for detecting phase jitters normalized to a predetermined position on a vector plane from the input/output information of said signal discriminator, a selector for selectively outputting the phase jitters detected by said phase jitter section, a selector control section for discriminating a region of signal points received by said communication apparatus by way of said transmission line and controlling said selector based on a result of the discrimination, a limiter section for limiting an output of said selector so as to fall within a range defined by a pair of threshold values and outputting a resulted signal to said forecasting filter, a phase phase jitter forecasting section for receiving the resulting signal from said limiter section for forecasting phase jitters which will be produced later from the normalized phase jitters detected by said phase jitter detection section, a power detection section for detecting a power of the normalized phase jitters detected by said phase jitter detection section, and a threshold value variation section for varying the threshold values of said limiter section based on the power of the normalized phase jitters detected by said power detection section.

* * * * *